United States Patent
Garcia Duran et al.

(10) Patent No.: US 6,753,372 B1
(45) Date of Patent: Jun. 22, 2004

(54) FLAME RETARDANT POLYOLEFIN COMPOSITIONS

(75) Inventors: Juan Antonio Garcia Duran, Geneva (CH); Loic Pierre Rolland, Divonne-les-Bains (FR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/462,971

(22) PCT Filed: Jul. 23, 1998

(86) PCT No.: PCT/US98/15229

§ 371 (c)(1),
(2), (4) Date: Jun. 28, 2000

(87) PCT Pub. No.: WO99/05214

PCT Pub. Date: Feb. 4, 1999

(30) Foreign Application Priority Data

Jul. 25, 1997 (EP) ............................................ 97202335

(51) Int. Cl.[7] .................................................. C08K 3/22
(52) U.S. Cl. ........................................................ 524/437
(58) Field of Search ................................. 524/425, 436, 524/437, 427, 416, 445, 451, 415, 127, 147, 140; 525/64, 84, 185

(56) References Cited

U.S. PATENT DOCUMENTS

| | | | | |
|---|---|---|---|---|
| 4,434,258 A | * | 2/1984 | Schumacher et al. | 524/437 |
| 4,614,680 A | * | 9/1986 | Fry et al. | 428/158 |
| 4,851,463 A | * | 7/1989 | Opsahl et al. | 524/437 |
| 5,346,963 A | * | 9/1994 | Hughes et al. | 525/285 |
| 5,434,217 A | * | 7/1995 | Spelthann | 525/185 |
| 5,610,234 A | * | 3/1997 | Spelthann | 525/64 |
| 5,859,129 A | * | 1/1999 | Bonner | 525/185 |

\* cited by examiner

*Primary Examiner*—Peter Szekely

(57) ABSTRACT

Halogen-free polyolefin blends are provided which are flame retardant and are particularly useful in replacing polyvinyl chloride for production of different products such as coatings for wire and cable and sheets for floor tiles. The blends comprise (1) ethylene vinyl acetate carbon monoxide terpolymer; (2) an ethylene vinyl acetate or polyolefin; (3) an ethylene vinyl acetate or polyolefin grafted with a carboxylic acid or an anhydride thereof; and (4) an inorganic filler.

1 Claim, No Drawings

FLAME RETARDANT POLYOLEFIN COMPOSITIONS

BACKGROUND OF THE INVENTION

1. Field of Invention

This invention relates to polyolefin compositions and more particularly to such compositions which are halogen-free and flame retardant, and to shaped articles made from them.

2. Background Discussion

Polyvinyl chloride (PVC) products have been on the market for many years and are commonly used in a large variety of applications. With the trend toward a chlorine-free environment, certain market segments such as the construction and wires and cables industries are in need of an alternative to PVC. Several halogen-free flame-retardant compounds are already available on the market but require difficult mixing processes. These compounds often need to be produced by specialized compounders, as the wire and cable and floor tile producers, themselves, often do not have the expertise.

For wire and cable applications, halogen-free flame-retardant materials are desirable to provide both insulation and jacketing in low-voltage cables in areas where it is necessary to avoid the generation of hazardous gases in the event of fire. Such areas where halogen-free low-voltage cables are useful include hotels, hospitals, schools, theaters and other such public spaces.

Important characteristics for jacketing materials is that they are highly flame retardant, good heat performance and good physical properties.

U.S. Pat. Nos. 4,948,669, 4,430,468, 4,434,258, 4,673,620, 4,701,359 disclose PVC-free compositions that are suitable for use as coatings for electrical cables. These compositions contain several components that are similar to those described herein, but lack, i.a., the terpolymer described herein.

SUMMARY OF THE INVENTION

According to the present invention there is provided a flame retardant, halogen-free polymer composition comprising a blend of (1) ethylene vinyl acetate carbon monoxide terpolymer containing 30–90% by weight ethylene, 10–70% by weight vinyl acetate and 1–40% by weight carbon monoxide;

(2) an ethylene vinyl acetate or polyolefin selected from the group consisting of (a) ethylene vinyl acetate containing 25–90% by weight ethylene and 10–75% by weight vinyl acetate, (b) a linear low density polyethylene, (c) a low density polyethylene, (d) a very low density polyethylene and (d) a high density polyethylene; and mixtures thereof;

(3) an ethylene vinyl acetate or polyolefin selected from the group consisting of (a) ethylene vinyl acetate containing 25–90% by weight ethylene and 10–75% by weight vinyl acetate, (b) a linear low density polyethylene, (c) a low density polyethylene, (d) a very low density polyethylene and (d) a high density polyethylene; and mixtures thereof; each of which is grafted with 0.05–3% by weight of a carboxylic acid or an anhydride thereof; and (4) an inorganic filler.

Common additives which may be included in the composition of the present invention include antioxidants, titanium dioxide (for UV resistance and to give a white color to the product), processing aids like zinc stearate and UV stabilizers.

DETAILED DESCRIPTION OF THE INVENTION

The present invention relates to flame retardant, halogen-free thermoplastic polymer blends which are useful in wire and cable coatings or in sheet form such as for use in floor tiles. These blends generally are formed by combining an ethylene vinyl acetate carbon monoxide (EVACO) terpolymer, an ethylene vinyl acetate (EVA) copolymer or polyolefin selected from EVA copolymer, a linear low density polyethylene, a low density polyethylene, a very low density polyethylene, a high density polyethylene and mixtures thereof, an ethylene vinyl acetate (EVA) copolymer or polyolefin selected from EVA copolymer, a linear low density polyethylene, a low density polyethylene, a very low density polyethylene, a high density polyethylene and mixtures thereof, each of which is grafted with a carboxylic acid or anhydride thereof, and an inorganic filler.

Polymer blends according to the present invention can be formed into wire and cable coatings or sheet form for uses such as for floor tiles, and have many properties comparable to polyvinyl chloride (PVC) containing blends, but are free from halogen.

Unless otherwise stated, percentage weight ranges for each of the components in the composition of the present invention are calculated exclusive of any additives which may be present.

The EVACO terpolymer (component (1)) useful in this invention preferably contains 30–90% by weight of ethylene, 10–70% by weight of vinyl acetate and 1–20% by weight of carbon monoxide, more preferably 55–65% by weight of ethylene and 20–30% by weight of vinyl acetate and 5–15% by weight carbon monoxide. In general, these EVACO's have a melt flow index (MFI) in the range of 1–50 g/10 min., preferably in the range of 10–40 g/10 min. as determined by ASTM D-1238 (measured at 2,16 kg and 190° C.) and are well-known in the art.

Component (1) preferably comprises 1–60% by weight of the composition of the present invention, more preferably 5–25% by weight, still more preferably 5–15% by weight.

The EVA copolymer when used as component (2) in this invention preferably contains 25–90% by weight of ethylene and 10–75% by weight of vinyl acetate, more preferably 55–75% by weight of ethylene and 15–30% by weight of vinyl acetate. In general, these EVA's have a melt flow index (MFI) in the range of 0.05–100 g/10 min., preferably less than 50 g/10 min. as determined by ASTM D-1238 (measured at 2,16 kg and 190° C.) and are well-known in the art.

The polyolefins when used as component (2) in general will have a melt flow index (MFI) in the range of 0.05–100 g/10 min., preferably less than 50 g/10 min. as determined by ASTM D-1238 (measured at 2,16 kg and 190° C.) and are well-known in the art.

Component (2) preferably comprises 1–50% by weight of the composition of the present invention, more preferably 5–25% by weight, still more preferably 10–20% by weight.

Component (3) is as defined as for component (2), but is further grafted with 0.05–3% by weight of a carboxylic acid or anhydride thereof, preferably maleic anhydride.

In general, component (3) will have a melt flow index (MFI) in the range of 0.05–100 g/10 min., preferably less than 20 g/10 min. as determined by ASTM D-1238 (measured at 2,16 kg and 190° C.).

Component (3) preferably comprises 1–40% by weight of the composition of the present invention, more preferably 1–15% by weight, still more preferably 3–10% by weight.

Component (4) is an inorganic filler. Suitable inorganic fillers are known in the art; preferred ones will also possess flame retardant characteristics. Specific, preferred inorganic fillers include aluminum trihydrate, magnesium hydroxide, calcium carbonate, calcinated clay, talcum, mica, zinc borates and mixtures thereof.

Component (4) preferably comprises 20–85% by weight of the composition of the present invention, more preferably 50–75% by weight, still more preferably 60–70% by weight.

The grafted moities of component (3) tend to react with the inorganic filler of component (4) (c.f. K. Hausmann, V. Flaris, Polymers & Polymer Composites Vol. 5, No 2, 1997 p 113 ff. This leads to further compatibilization of the composition. Compositions with higher levels of compatibilization have higher mechanical strength, which allow for higher levels of inorganic filler and thus, compositions with higher flame retardancy.

In addition to its polymer and flame retardant filler components, the composition of the present invention can be blended with common additives such as antioxidants, UV stabilizers, lubricants (e.g., oleamide), antiblocking agents, antistatic agents, waxes, pigments, titanium dioxide, talc and other processing aids (e.g., zinc stearate) known in the polymer compounding art. The additives may comprise up to about 10 weight percent of the total composition based on polymer components, flame retardant fillers plus additives.

The blends of the invention can be prepared by mixing the polymeric ingredients flame retardant fillers and optional additives by use of conventional masticating equipment, for example, a rubber mill, Brabender Mixer, Banbury Mixer, Buss-ko kneader, Farrel continuous mixer or twin screw continuous mixer. Mixing times should be sufficient to obtain homogeneous blends and a proper reaction between maleic anhydride groups and the flame retardant fillers (component (4)). Typically, mixing times of about 5 minutes and mixing temperatures of 160° C. are satisfactory. If the polymer blend is non-homogeneous, additional mixing is required.

The invention can be further understood by the following examples in which parts and percentages are by weight or in parts per hundred rubber (phr) and temperatures are in degrees Celsius.

EXAMPLES 1–4

Legend

MFI=melt flow index
EVACO=ethylene vinyl acetate carbon monoxide
EVA=ethylene vinyl acetate
EVA+MAH=ethylene vinyl acetate grafted with maleic anhydride
HDPE+MAH=high density polyethylene grafted with maleic anhydride
ATH=aluminum trihydrate
MAH=maleic anhydride Procedure A blend is prepared by melt-compounding the following components in the proportions set forth in Table 1 below.

EVACO (71.5% ethylene, 20.5% vinyl acetate and 8% carbon monoxide) having a MFI (1900/2.16 kg) of 15

EVA (72% ethylene and 28% vinyl acetate) having a MFI (1900/2.16 kg) of 3.0

EVA+MAH (72% ethylene and 28% vinyl acetate grafted with 1.5% MAH) having a MFI (1900/2.16 kg) of 1.4

HDPE+MAH (grafted with 0.9% MAH) having a density of 0.955 g/cc and a MFI (1900/2.16 kg) of 2.0

VLDPE having a density of 0.902 g/cc and a MFI (1900/2.16 kg) of 1.0 antioxidant—phenolic type available under the name IRGANOX 1010 from Ciba Specialty Chemicals Melt compounding is carried out on a two roll mill with batches from 100 grams at 150–170° C. for ca. 5 minutes. The milled product is formed into a testing plaque in a hydraulic press at 150–170° C. for 5 minutes. Afterwards stress-strain testing (ASTM D-412), Limited oxygen Index i.e. LOI (ASTM D 2863) and Knife Penetration at 80 and 90° C. (IEC 540 Item 10.1) are carried out. Results are shown in Table 1.

TABLE 1

| Example numbers | 1 | 2 |
| --- | --- | --- |
| EVACO | 10 | 10 |
| EVA | 16 | 13 |
| EVA + MAH | 9 | 4 |
| HDPE + MAH | — | 4 |
| VLDPE | — | 4 |
| ATH | 64.7 | 64.7 |
| Antioxidant | 0.3 | 0.3 |
| Tensile strength (MPa) | 14.6 | 15.7 |
| Tensile elongation (%) | 150 | 140 |
| Knife Penetr. at 80° C. (%) | 80 | 0 |
| Knife Penetr. at 90° C. (%) | 100 | 0 |
| LOI (%) | 38 | 35 |

One can see that the formulation containing HDPE+MAH and VLDPE show particularly lower knife penetration values (better heat performance) but lower flame retardancy than the formulation without. For some wire and cable applications, heat performance can be of major importance while in others flame retardancy is the most important criteria

What is claimed is:

1. A flame retardant, halogen-free polymer composition comprising a blend of
    (1) ethylene vinyl acetate carbon monoxide terpolymer containing 30–90% by weight ethylene, 10–70% by weight vinyl acetate and 1–40% by weight carbon monoxide;
    (2) an ethylene vinyl acetate or polyolefin selected from the group consisting of (a) ethylene vinyl acetate containing 25–90% by weight ethylene and 10–75% by weight vinyl acetate, (b) a linear low density polyethylene, (c) a low density polyethylene, (d) a very low density polyethylene and (e) a high density polyethylene; and mixtures thereof;
    (3) an ethylene vinyl acetate or polyolefin selected from the group consisting of (a) ethylene vinyl acetate containing 25–90% by weight ethylene and 10–75% by weight vinyl acetate, (b) a linear low density polyethylene, (c) a low density polyethylene, (d) a very low density polyethylene and (e) a high density polyethylene; and mixtures thereof; each of which is grafted with 0.053% by weight of a carboxylic acid or an anhydride thereof; and (4) aluminum trihydrate;
wherein component (1) comprises 5–15% by weight of the blend, component (2) comprises 10–20% by weight of the blend component (3) comprises 3–10% by weight of the blend, and component (4) comprises 60–70% by weight of the blend and wherein the Limited Oxygen Index as measured according to ASTM 2863 is in the range of 35 to 38.

* * * * *

UNITED STATES PATENT AND TRADEMARK OFFICE
CERTIFICATE OF CORRECTION

PATENT NO. : 6,753,372 B1
DATED : June 22, 2004
INVENTOR(S) : Garcia Duran Juan-Antonio and Rolland Loic Pierre It is certified that error appears in the above-identified patent and that said Letters Patent is hereby corrected as shown below:

Column 4,
Line 66, delete "0.053%" add -- 0.05-3% --

Signed and Sealed this

Sixteenth Day of November, 2004

JON W. DUDAS
*Director of the United States Patent and Trademark Office*